United States Patent
Wu et al.

(10) Patent No.: US 12,363,398 B1
(45) Date of Patent: Jul. 15, 2025

(54) MANAGEMENT OF SCTE AND CONTENTS IN AD BREAKS FOR COMPATIBILITY

(71) Applicant: Amazon Technologies, Inc., Seattle, WA (US)

(72) Inventors: Yongjun Wu, Bellevue, WA (US); Benjamin Raphael Forman, Watford (GB); Avinash Priya Khurana, Beaverton, OR (US); James Wesley Bell, Plano, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/810,057

(22) Filed: Jun. 30, 2022

(51) Int. Cl.
*H04N 21/845* (2011.01)
*H04N 21/2187* (2011.01)
*H04N 21/234* (2011.01)

(52) U.S. Cl.
CPC ..... *H04N 21/8456* (2013.01); *H04N 21/2187* (2013.01); *H04N 21/23424* (2013.01)

(58) Field of Classification Search
CPC ........... H04N 21/8456; H04N 21/2187; H04N 21/23424
USPC .......................................................... 386/241
See application file for complete search history.

(56) References Cited

U.S. PATENT DOCUMENTS

| | | | |
|---|---|---|---|
| 9,438,936 B1* | 9/2016 | Srinivasan | H04N 21/812 |
| 10,200,434 B1* | 2/2019 | Wells | H04N 21/4385 |
| 10,809,956 B1* | 10/2020 | Bragdon | G06F 3/04842 |
| 10,958,702 B1* | 3/2021 | Yang | H04L 65/75 |
| 11,218,784 B1* | 1/2022 | Mekuria | H04N 21/84 |
| 2008/0313541 A1* | 12/2008 | Shafton | G06F 16/78 |
| | | | 715/725 |
| 2014/0140253 A1* | 5/2014 | Lohmar | H04W 52/0216 |
| | | | 370/311 |
| 2014/0351318 A1* | 11/2014 | Friedrich | H04N 21/2362 |
| | | | 709/203 |
| 2021/0168472 A1* | 6/2021 | Monaco | H04N 21/23406 |
| 2021/0306686 A1* | 9/2021 | Link | H04L 65/1089 |

* cited by examiner

*Primary Examiner* — Loi H Tran
(74) *Attorney, Agent, or Firm* — Weaver Austin Villeneuve & Sampson LLP

(57) ABSTRACT

Methods and apparatus are described for delivering streams of media content in ways that maintain compatibility among different streaming protocols for inserting secondary content into the streams of media content. This is accomplished by encoding media content the same for each streaming protocol but generating different output groups based on each streaming protocol.

19 Claims, 3 Drawing Sheets

MANAGEMENT OF SCTE AND CONTENTS IN AD BREAKS FOR COMPATIBILITY

BACKGROUND

Video streaming may involve transmission of fragments according to one of various streaming protocols, including DASH, HLS, Sye, or Microsoft® Smooth Streaming. The content may be live content or video on demand (VOD) content. Live content may be encoded and packaged according to various streaming protocols for delivery to client devices. Each streaming protocol may have different functionality and constraints for inserting secondary content.

DETAILED DESCRIPTION

Figure 1:
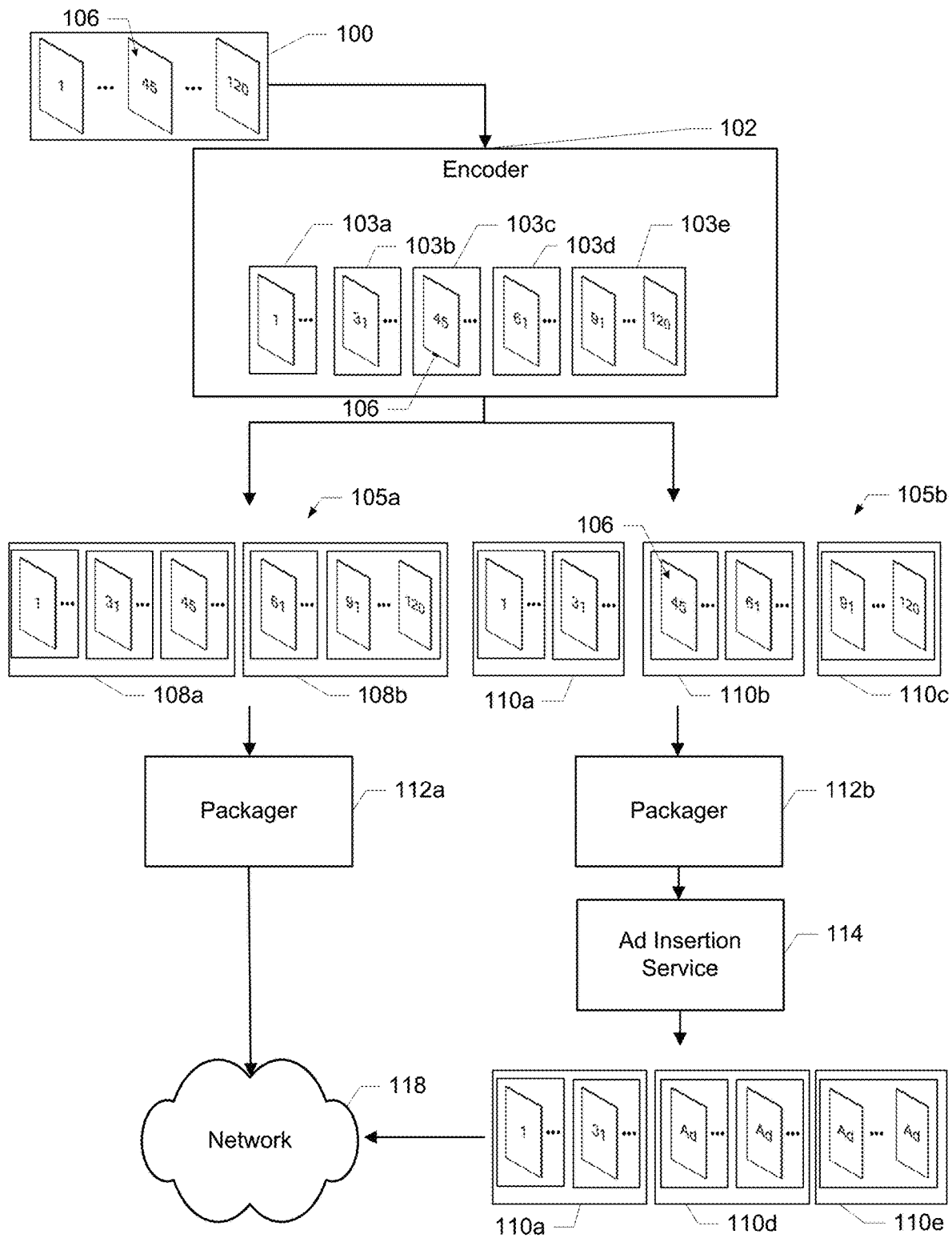
FIG. 1 is a simplified diagram illustrating operation of an example of a system for distributing media content as enabled by the present disclosure.

This disclosure describes techniques for encoding content for compatibility amongst various streaming technologies, particularly compatibility for inserting secondary content. Secondary content, e.g., advertisements, may be included in a live stream by various techniques. Burn-in advertisements may be included in media content as part of the stream provided to an encoder. Dynamic ad insertion (DAI) is a server-side ad insertion technique that uses markers to signal opportunities to update manifest data with references to advertisement content that replaces the existing manifest references prior to providing a manifest to client devices. DAI is preferable as advertisement content may be selected based on properties associated with the client device requesting and receiving the manifest. Markers that signal an opportunity for DAI may be placed at any point in a live stream.

While DAI is preferable for personalized advertisements, streaming technologies have different constraints in how secondary content may be added, particularly for live content. In some streaming protocols, a live manifest may be updated throughout a live event to provide references to segments. As the manifest data is updated throughout the live event, secondary content may be inserted by providing updated manifest data that includes references to the secondary content. Secondary content may be inserted using markers that may be inserted into a live stream to signal advertising opportunities. The updated manifest data may include the markers so that an ad insertion server may replace references to encoded segments of live event content with references to ad content based on the markers. Furthermore, while segments may typically be generated to have a constant duration, e.g., one second or two seconds of content, segments may be generated based on the markers. Markers may indicate an ad insertion point that is not on a segment boundary, thus a truncated segment may be generated to have a segment boundary at the ad insertion point. As some streaming protocols provide the duration of recently encoded segments in the updated manifest data, variable duration segments do not cause streaming to fail or break in a way that disturbs a user experience.

In other streaming protocols, a live manifest may not be updated throughout a live event. Instead, a manifest is provided at the start of streaming that allows a client to request all to-be-encoded segments. As the manifest is not updated during streaming, markers cannot be used during streaming to signal an ad insertion opportunity. Furthermore, as the manifest data indicates the duration of segments, segments that deviate from the indicated duration may cause the playback experience to fail or break, disturbing the user experience. For example, some implementations of streaming protocols such as Microsoft Smooth Streaming (MSS) may require a constant duration of fragments, which presents difficulties when markers for inserting secondary content do not correspond with segment boundaries (as segments would be generated having a different duration). Other streaming technologies, e.g., Hypertext Transfer Protocol (HTTP) Live Streaming (HLS), Dynamic Adaptive Streaming over HTTP (DASH), or Sye allow for variable length fragments such that segments may be truncated to align secondary content markers and segments, which is compatible with DAI. While different encodings of media content may be generated for MSS compared to HLS and DASH to satisfy the constraints of each streaming technology, additional encodings of media content are expensive and reduces efficiency in delivering live content.

Thus, techniques disclosed herein improve efficiency and reduce costs by using a single encoding of content that is compatible with multiple streaming technologies. To achieve this compatibility, different output groups from the same encoder may be configured, where each output group satisfies the constraints of one or more corresponding streaming technologies. An example may be instructive.

FIG. 1 illustrates a simplified diagram of an example of a system in which media content is encoded, packaged, and transmitted according to a specific implementation enabled by the present disclosure. An encoder 102 receives live source media content 100 that includes a sequence of frames. The sequence of frames is labelled 1-120 in FIG. 1, but it should be understood that a live feed has many more frames. A marker 106 is associated with frame 45 to signal an opportunity to insert secondary content. This marker may be a variety of signals or metadata. For example, the standard "Digital Program Insertion Cueing Message for Cable," also referred to as SCTE-35, is a standard that describes an inline marker that signals an ad insertion opportunity in a stream. It should be understood that markers may be provided in a live feed prior to where secondary content is to be inserted. For example, a marker may be added several seconds in advance of frame 45 that indicates frame 45 is a location of an ad insertion opportunity.

The source media content is provided to the encoder 102, which encodes the media content into groups of pictures (GOP) 103a-e. A GOP refers to a set of frames that are all derived from a single reference frame. In particular, a GOP is initialized with an instantaneous decoder refresh (IDR) frame, which is a frame that can be decoded without reference to other frames and also signals that prior frame information will not be used for decoding. In the example of FIG. 1, frames 1, 31, 45, 61, and 91 are IDR frames, as they each begin a respective GOP. Subsequent frames in the GOP may then be defined in reference to the IDR frame or frames derived from the IDR frame, such as P- or B-frames. The end of a GOP may be indicated by another IDR frame that starts the next GOP. While 5 GOPs are shown in FIG. 1, it should be understood that the number of GOPs and the number of frames within a GOP may vary. In the example of FIG. 1, frame 45 is encoded as an IDR frame based on marker 106 in order to facilitate ad insertion, as will be discussed further herein. Furthermore, while 5 GOPs are present, GOPs 103a-c and 103d-e each cover a total of 60 frames, which may correspond to a one- or two-second duration depending on the number of frames per second.

Encoder 102 outputs encoded media content in output group 105a and 105b. Output groups may be generated by multiplexing, or muxing, encoded video content and encoded audio content. Each output group may share the same underlying encoded video content, which may be encoded according to a "leaky bucket" model employed by the encoder to generate GOPs 103a-e. However, the output groups may differ in how GOPs are partitioned across segments of media content. Thus, output group 105a and output group 105b share the same encoded media content and GOPs, but have different segment structures. In some implementations, a single encoder or a single encoder job generates output groups 105a and 105b based on a single live stream.

A segment of media content contains one or more complete GOPs. As a segment may be independently requested by a client device, each GOP is complete within a segment so that the segment is self-sufficient for a client to decode all of the frames in the segment. In some streaming protocols, such as certain implementations of Smooth Streaming, a segment must also have a fixed duration, such as 2 seconds, based on parameters indicated in a manifest provided at the start of streaming. Thus, depending on the number of frames per second, each segment streamed using Smooth Streaming may have, e.g., 60 or 120 frames. Other streaming protocols such as HLS, DASH, or Sye allow for variable duration segments. Encoder 102 is thus configured to encode frames such that GOPs fall along two second boundaries, though GOPs may also have a shorter duration (in consideration that two or more GOPs may have a combined duration of two seconds). Thus, output group 105a has segments 108a and 108b that both contain GOPs totaling 60 frames each, as GOPs 103a-c contain encodings of frames 1-60, while GOPs 103d-e contain encodings of frames 61-120. Segments 108a and 108b thus have the same duration, which may be required to use Smooth Streaming. Conversely, output group 105b has segments 110a-c that have variable durations, as segment 110a contains encodings of frames 1-44, segment 110b contains encodings of frames 45-90, and segment 110c contains encodings of frames 91-120.

The segment structure of output group 105b allows for ad insertion as indicated by marker 106. Server-side ad insertion typically replaces complete segments, using markers such as marker 106 as a cue on where to insert secondary content. Thus, by generating segment 110b that starts at marker 106, segment 110b may be replaced with secondary content inserted by an advertisement insertion service.

While the segments of output group 105b are of variable lengths and different from the lengths of segments of output group 105a, the underlying GOPs for each output group are the same. Thus, a single encoding of the live feed may be used for generating both output group 105a and output group 105b.

The segments of output group 105a and 105b may be provided to packagers 112a and 112b, respectively. Packagers 112a and 112b may package the encoded media content according to various container formats and streaming protocols as described herein. In some implementations packagers 112a and 112b may generate manifests that may be transmitted over network 118 to be cached and ultimately provided to a client device that may use the manifest to request segments of media content for playback.

In some implementations manifests generated by, e.g., packager 112b are provided to an ad insertion service 114. Ad insertion service may replace references to segments based on parameters associated with a client device requesting the manifest. Thus, advertisement content that is more relevant to a user of the client device may be provided for playback. Marker 106 may signal opportunities to replace segments with advertisement content. While a single marker 106 has been described in reference to FIG. 1, in some implementations, markers are present in pairs, one signaling the start of an opportunity to insert advertisements, and the other marker indicating the end of the opportunity. In other embodiments the first marker may indicate various metadata for inserting advertisement content, e.g., a duration of the ad break. Segments 110d and 110e illustrate replacements of segments 110b and 110c with advertisement content.

Figure 2:
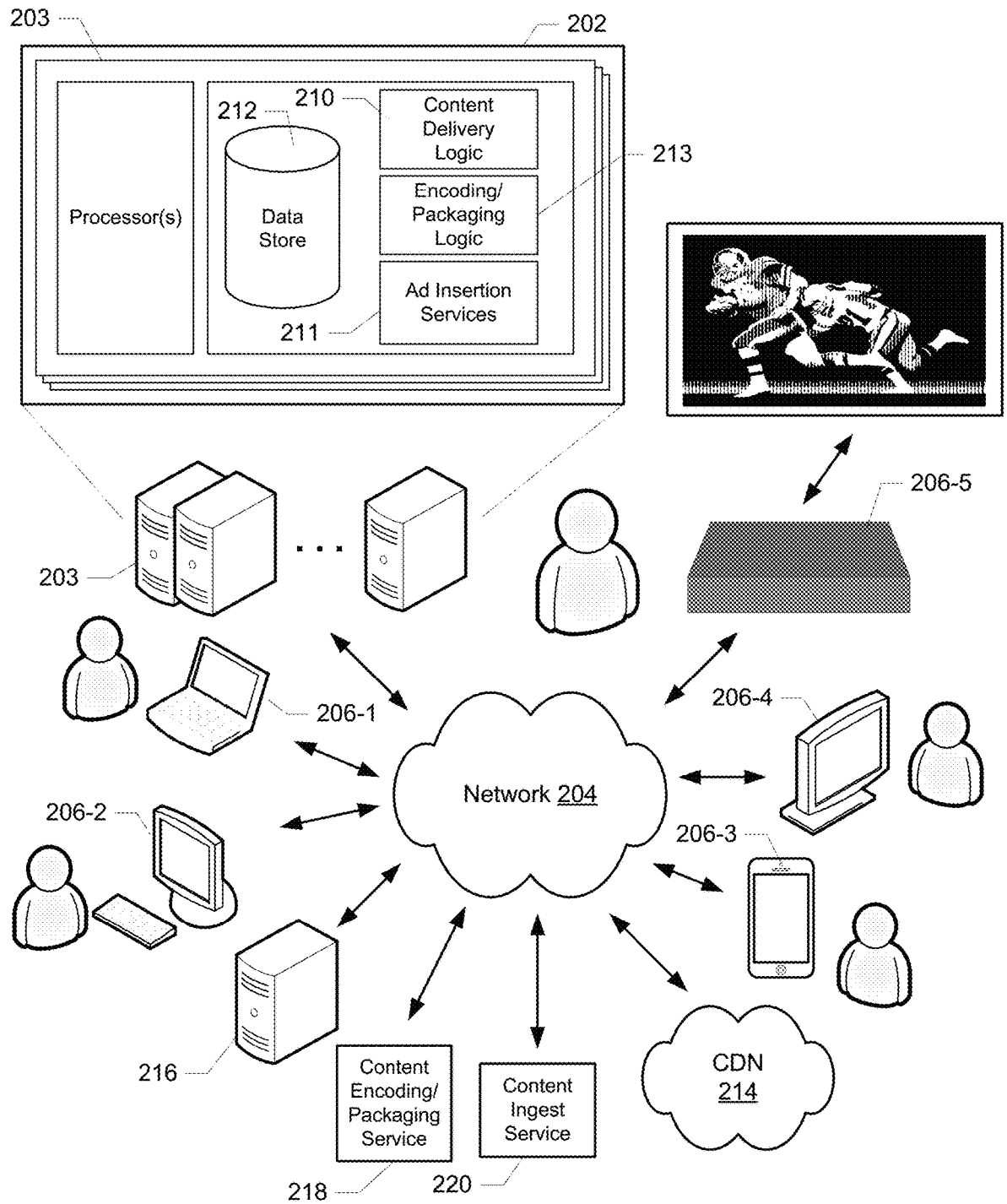
FIG. 2 is a simplified diagram of an example of a computing environment in which implementations enabled by the present disclosure may be practiced.

FIG. 2 illustrates an example of a computing environment in which a video content service 202 provides streaming content via network 204 to a variety of client devices (206-1 through 206-5) in accordance with the techniques described herein. Content service 202 may conform to any of a wide variety of architectures such as, for example, a services platform deployed at one or more co-locations, each implemented with one or more servers 203. Network 204 represents any subset or combination of a wide variety of network environments including, for example, TCP/IP or UDP/IP-based networks, telecommunications networks, wireless networks, satellite networks, cable networks, public networks, private networks, wide area networks, local area networks, the Internet, the World Wide Web, intranets, extranets, and so on. Client devices 206 may be any suitable device capable of connecting to network 204 and consuming content provided by service 202. Such devices may include, for example, mobile devices (e.g., cell phones, smart phones, and tablets), personal computers (e.g., laptops and desktops), set top boxes (e.g., for cable, satellite, and online systems), smart televisions, gaming consoles, wearable computing devices (e.g., smart watches or smart glasses), etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 202. Alternatively, such resources may be independent of content service 202, e.g., on a platform under control of a separate provider of computing resources with which content service 202 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

In the following examples and for the sake of simplicity, content service 202 is described as if it is integrated with the platform(s) that encodes, packages, and provides the content to client devices. However, it will be understood that content service 202 may provide access to content in conjunction with one or more content delivery networks (e.g., CDN 214) that may or may not be independent of content service 202. In addition, the source(s) of the content (and/or the resources used to encode and package the content) may or may not be independent of content service 202 (e.g., as represented by content provider server 216 and content encoding/packaging service 218). The range of variations known to those of skill in the art are contemplated to be within the scope of this disclosure.

It should also be noted that implementations are contemplated in which, in addition to content delivery logic 210 (which facilitates various aspects of content delivery to client devices 206), content service 202 may include other types of logic. For example, encoding and packaging logic 213 may encode content using any of a variety of video encoding standards such as, for example, AVC (H.264), HEVC (H.265), AV1, VP8, VP9, etc., as well as any of a variety of file formats including, for example, MP4, CMAF, etc. Content may be packaged and delivered using an adaptive bit rate streaming technique such as, for example, MPEG-DASH (Dynamic Adaptive Streaming over HTTP), Apple® HLS (HTTP Live Streaming), Microsoft® Smooth Streaming, or Sye, to name a few representative examples. Delivery of the encoded content may be performed using the user datagram protocol (UDP) of the Internet protocol (IP). As will be appreciated, the use of UDP may be advantageous for the delivery of media content depicting live events given its low latency when compared to the transport control protocol (TCP). An example of a platform that delivers media content using UDP/IP and which may be enhanced using the techniques described herein is the Sye streaming protocol originally developed by Net Insight AB and acquired by Amazon.com, Inc. It should be noted that the techniques described herein are compatible with a wide range of content services, media players, DRM systems, encryption technologies, streaming technologies, and codecs, the details of which are known to those of skill in the art.

It should also be noted that implementations are contemplated in which, in addition to content delivery logic 210 (which facilitates various aspects of content delivery to client devices 206), content service 202 may include other types of logic, e.g., ad insertion logic 211 that facilitates selecting and inserting ads into ad breaks of a manifest. Although the ad insertion logic 211 is shown to be associated with the content service 202, it may be possible that the ad insertion logic 211 is associated with the content service 202 and/or a third-party service.

In addition to providing access to video content, content service 202 may also include a variety of information related to the video content. Alternatively, such information associated with and/or about the content, as well as the content itself may be provided and/or hosted by one or more separate platforms, e.g., CDN 214. It should be noted that, while logic 210 and 211, and data store 212 are shown as integrated with content service 202, implementations are contemplated in which some or all of these operate remotely from the associated content service, and/or are under the control of an independent entity. From these examples, those of skill in the art will understand the diversity of use cases to which the techniques described herein are applicable.

In addition to providing access to video content, content service 202 may also include a variety of information related to the video content (e.g., other associated metadata and manifests in data store 212 to which service 202 provides access). Alternatively, such information about the content, as well as the content itself may be provided and/or hosted by one or more separate platforms, e.g., CDN 214, service 218. It should be noted that, while logic 210, 211, and 213, and data store 212 are shown as integrated with content service 202, implementations are contemplated in which some or all of these operate remotely from the associated content service, and/or are under the control of an independent entity. For example, logic 211 and 213 may be implemented by encoding/packaging service 218. From these examples, those of skill in the art will understand the diversity of use cases to which the techniques described herein are applicable.

Figure 3:
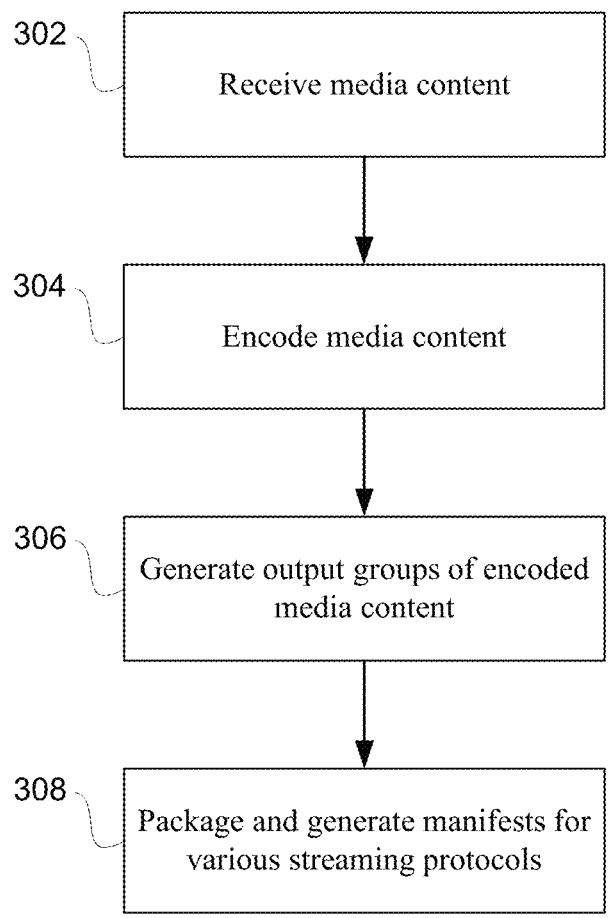
FIG. 3 is a flowchart illustrating operation of an implementation enabled by the present disclosure.

FIG. 3 is a flowchart illustrating operation of a particular class of implementations enabled by the present disclosure. Live media content is received (302). Media content may include a sequence of video frames and associated audio. In some implementations media content may include live event content, such as a sporting event or concert, as well as secondary content, e.g., advertisements. In some implementations, advertisements are included as part of a live stream, which may be referred to as "burn-in" ads, as the advertisements are provided as part of the stream provided to an encoder, rather than ads that are inserted as part encoding (e.g., ad slates) or downstream from an encoder (e.g., from an ad insertion service updating a manifest before providing it to a client). In some implementations, markers may be present in the live stream that signal locations to insert secondary content. In some implementations, markers indicate the location of burn-in ads, signaling that the burn-in ads may be replaced with different secondary content by, e.g., an ad insertion service prior to providing a manifest to client devices for playback. In some implementations, ad insertion markers may be associated with frames of the live event.

Media content is encoded (304). An encoder may be configured to employ a leaky bucket model for the encoding of media content. Various configurations of the leaky bucket model may be set and used to encode the media content. Notably, while an encoder may determine which frames to encode as IDR frames and determine GOP structures based on analyzing video frames of the live stream, in some implementations, frames that correspond to locations indicated by markers for ad insertion may be encoded as IDR frames that start a GOP. Furthermore, while the present disclosure discusses a start location for an ad insertion opportunity, it should be understood that markers may also indicate a duration of an ad insertion opportunity, including an end for the ad insertion opportunity. Thus, in some embodiments each marker may be associated with a start frame and an end frame, where both frames may be encoded as IDR frames to facilitate segment boundaries at the start and end of an ad insertion opportunity as described herein.

Output groups are generated based on the encoded media content (306). As noted above, output groups may share the same encoded media content encoded according to a particular codec, but each output group may be multiplexed to include different audio or have different segments. In some embodiments, one or more output groups have segments where the first frame of the first GOP for that segment is a location indicated by a marker for ad insertion. As frames associated with ad insertion markers are at the start of the segment, references to such segments may be replaced with references to advertisement content.

Conversely, in some embodiments, one or more output groups may maintain a constant duration for each segment. This may result in one or more frames that are indicated as locations for ad insertion as not being the first frame of a segment. While the live media content may have been encoded to have GOPs to start at locations indicated by ad insertion markers, one or more output groups may not include those markers and/or may not have segments where the frame associated with the locations indicated by the marker is at the start of the segment.

In some implementations a single encoder or a single encoding job is used to generate encodings of media content for each output group. Using a single encoder or single encoding job to generate encodings that may be used for multiple streaming protocols that have different restrictions and preferences on segment lengths and ad insertion is preferable to reduce redundancy that may otherwise occur in having different encoders for different streaming protocols.

In some implementations, one output group may be associated with Microsoft® Smooth Streaming, which requires a constant duration of all segments. While segments of media content will include IDR frames at the location indicated by ad insertion markers, the segments will have a constant duration, e.g., two seconds. In some implementations ad insertion markers may be removed to prevent an ad insertion service from attempting to insert references to advertisements.

In some implementations, one output group may be associated with DASH or HLS. DASH or HLS support variable duration segments. Thus, segments may be partitioned or truncated based on ad insertion markers so that a manifest may be updated to include references to advertisement content. In some implementations, output groups for DASH or HLS may also be configured to use ad slates. Ad slates represent a default advertisement or media content that may be displayed if an ad inserted by server does not fill the entire duration of an ad break. For example, if an ad break duration is 32 seconds but the ad inserted into a manifest is only 30 seconds, an ad slate may be inserted to fill the remaining 2 seconds before transitioning back to primary/live event content.

In some implementations, one output group may be associated with Sye. Sye is a streaming protocol that delivers media content using UDP/IP, which may be advantageous for the delivery of media content depicting live events given its low latency when compared to the transport control protocol (TCP). Streaming performed using the Sye protocol may not use ad slates but rely on burn-in ads or live event content when DAI is unavailable.

Media content is then packaged and manifests are generated for various streaming protocols (308). Each output group may be associated with one or more packagers/streaming protocols. Manifests may include references to segments or provide information that allows a client to construct references to segments. When a user desires to playback a live event, a client device requests a manifest that may then be used to request segments of media content. Once a request for playback is received, if the streaming protocol is compatible with DAI parameters associated with the client device and a manifest may be provided to an ad insertion service that replaces references in the manifest with references to advertisement content. The segments that can be replaced may be indicated by the ad insertion markers. Some streaming protocols may support dynamic or server-side ad insertion, including HLS, DASH, and Sye, while other streaming protocols may not support dynamic or server-side ad insertion, including Smooth Streaming. A client device that received a manifest having references replaced with secondary content would then request the inserted secondary content instead of the originally encoded media content as encoded in step 302.

Separately, if the client is streaming based on a protocol that does not support DAI or is restricted in segment lengths such that it is incompatible with DAI, the client may receive a manifest that does not have references replaced to refer to secondary content. In such embodiments, a client may playback burn-in ads rather than dynamically inserted ads.

In some implementations media content may be packaged by combining segments. For example, as noted above, HLS and DASH support non-two second duration segments, while Smooth Streaming may require 2 second fragments. In some implementations, sub-two second segments may be combined to generate 2 second segments that are supported by Smooth Streaming. In some implementations, the GOP structure can be the same for all output groups and segments include complete GOPs. Thus, in some implementations smaller segments may be combined to generate segments having a two second duration.

While the subject matter of this application has been particularly shown and described with reference to specific implementations thereof, it will be understood by those skilled in the art that changes in the form and details of the disclosed implementations may be made without departing from the spirit or scope of the invention. For example, implementations have been described in which information representing bucket fullness and relating to a leaky-bucket model employed by an encoder is used to determine the transmission timing of packets of content. It should be noted, however, that implementations are contemplated in which information relating to an encoder's rate controller may be employed as described herein to control the transmission timing of the content packets. That is, any information used to determine an encoding bit rate may also be employed to determine timing information for the transmission of packets as described herein to achieve a transmission bit rate that is smoothed relative to the encoding bit rate.

Examples of some implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A system comprising one or more memories and one or more processors configured for:
   receiving live source media content comprising one or more frames associated with corresponding one or more markers indicating an ad break;
   encoding the live source media content to generate encoded media content, wherein the encoded one or more frames are instantaneous decoder refresh (IDR) frames;
   generating a sequence of first segments based on the encoded media content, wherein each of the encoded one or more frames is an initial frame of a corresponding first segment;
   generating a sequence of second segments based on the encoded media content, wherein at least one of the encoded one or more frames is not an initial frame of a second segment, wherein each of the second segments has a same constant duration;

packaging the first segments based on a first streaming protocol;
packaging the second segments based on a second streaming protocol, wherein the second streaming protocol requires a constant duration for each second segment of the second segments;
receiving a first request from a first client device for a manifest according to the first streaming protocol;
providing a first manifest to the first client device, wherein the first manifest has references to the first segments, wherein one or more references to the first segments are replaced with references to advertisement content;
receiving a second request from a second client device for a manifest according to the second streaming protocol; and
providing a second manifest to the second client device, wherein the second manifest comprises references to the second segments.

2. The system of claim 1, wherein the first streaming protocol is HTTP Live Streaming (HLS), MPEG-DASH, or Sye Streaming, and wherein the second streaming protocol is Microsoft Smooth Streaming (MSS).

3. The system of claim 1, wherein the one or more markers indicate one or more fragments of encoded media content to be replaced with advertisement content.

4. A system comprising one or more memories and one or more processors configured for:
receiving live source media content comprising a first frame associated with a marker, wherein the marker indicates a location to insert secondary content;
encoding the live source media content to generate encoded media content, including an encoded first frame associated with the marker;
outputting a sequence of first segments based on the encoded media content, wherein a first segment of the sequence of first segments has an initial frame that is the encoded first frame, wherein the first segment has a first duration;
outputting a sequence of second segments based on the encoded media content, wherein each second segment has a second duration that is different from the first duration, wherein each of the second segments has a same constant duration, wherein the encoded first frame is not the initial frame of any segments of the sequence of second segments;
packaging the sequence of first segments based on a first streaming protocol; and
packaging the sequence of second segments based on a second streaming protocol, wherein the second streaming protocol requires a constant duration for each second segment of the second segments.

5. The system of claim 4, wherein the marker is present in the sequence of first segments and the marker is not present in the sequence of second segments.

6. The system of claim 4, wherein the encoded media content includes an IDR frame at the location indicated by the marker.

7. The system of claim 4, wherein the sequence of first segments and the sequence of second segments comprise the same sequence of groups of pictures.

8. The system of claim 4, wherein the live source media content includes primary content before the location indicated by the marker and transitions to secondary content at the locating indicated by the marker.

9. The system of claim 4, wherein the one or more memories and one or more processors are further configured for:
generating a first manifest comprising references to the first segments, and replacing one or more references to the first segments after the location indicated by the marker with references to secondary content.

10. The system of claim 9, wherein the one or more memories and one or more processors are further configured for:
receiving a request for the first manifest from the client device, wherein the references to secondary content are based on parameters associated with the client device.

11. The system of claim 4, wherein two segments of the first segments include two segments having a combined duration equal to the second duration, and the one or more memories and one or more processors are further configured for outputting the sequence of second segments based on combining the two segments.

12. A method, comprising:
receiving live source media content comprising a first frame associated with a marker, wherein the marker indicates a location to insert secondary content;
encoding the live source media content to generate encoded media content, including an encoded first frame associated with the marker;
outputting a sequence of first segments based on the encoded media content, wherein a first segment of the sequence of first segments has an initial frame that is the encoded first frame, wherein the first segment has a first duration; and
outputting a sequence of second segments based on the encoded media content, wherein each second segment has a second duration that is different from the first duration, wherein each of the second segments has a same constant duration, wherein the encoded first frame is not the initial frame of any segments of the sequence of second segments;
packaging the sequence of first segments based on a first streaming protocol; and
packaging the sequence of second segments based on a second streaming protocol, wherein the second streaming protocol requires a constant duration for each second segment of the second segments.

13. The method of claim 12, wherein the marker is present in the sequence of first segments and the location indicated by the marker is not present in the sequence of second segments.

14. The method of claim 12, wherein the encoded media content includes an IDR frame at the location indicated by the marker.

15. The method of claim 12, wherein the sequence of first segments and the sequence of second segments comprise the same sequence of groups of pictures.

16. The method of claim 12, wherein the live source media content includes primary content before the location indicated by the marker and transitions to secondary content at the location indicated by the marker.

17. The method of claim 12, further comprising:
generating a first manifest comprising references to the first segments, and replacing one or more references to the first segments after the location indicated by the marker with references to secondary content.

18. The method of claim 17, further comprising receiving a request for the first manifest from the client device, wherein the references to secondary content are based on parameters associated with the client device.

19. The method of claim 12, wherein the first segments include two segments having a combined duration equal to the second duration, and the method further comprises outputting the sequence of second segments based on combining the two segments.

* * * * *